United States Patent [19]

Dicks et al.

[11] Patent Number: 5,201,928
[45] Date of Patent: Apr. 13, 1993

[54] GLASS SHEET FORMING METHOD AND APPARATUS

[75] Inventors: Karl-Heinz Dicks, Simmerath, Fed. Rep. of Germany; Eustace H. Mumford, Ottawa Lake, Mich.

[73] Assignee: Glasstech, Inc., Perrysburg, Ohio

[21] Appl. No.: 718,001

[22] Filed: Jun. 20, 1991

[51] Int. Cl.$^5$ .............................. C03B 23/023
[52] U.S. Cl. ........................ 65/106; 65/107; 65/268; 65/273
[58] Field of Search ............... 65/104, 106, 107, 253, 65/268, 273; 198/826

[56] References Cited

U.S. PATENT DOCUMENTS 4,723,983 2/1988 Erdmann et al. .................. 65/268
4,773,925 9/1988 Schultz .............................. 65/106

FOREIGN PATENT DOCUMENTS 2221409 11/1974 France ............................ 65/107

Primary Examiner—Joye L. Woodard
Attorney, Agent, or Firm—Brooks & Kushman

[57] ABSTRACT

A glass sheet forming apparatus (20) for continuously forming a heated glass sheet includes a roller conveyor (30) defined by a plurality of interposed first and second conveyor rolls (32,34). The first conveyor rolls (32) are mounted in a plane defined by X and Y axes for conveying the glass sheet. The second conveyor rolls (34) include independent first and second roll portions (36,38). At least one of the roll portions (36) is movable in the plane to establish rotation of the roll portion (36) with respect to a Z direction. The second conveyor rolls (34) are mounted in a plane defined by X' axis. A first actuator (44) moves the movable roll portions (36) so that part of the movable rolls (36) are elevated above the X' axis and above the first conveyor rolls (32) whereby the roller conveyor (30) becomes non-planar and a heated glass sheet is formed as a result of the non-planar conveyor shape and upward action of the second conveyor rolls (34).

39 Claims, 3 Drawing Sheets

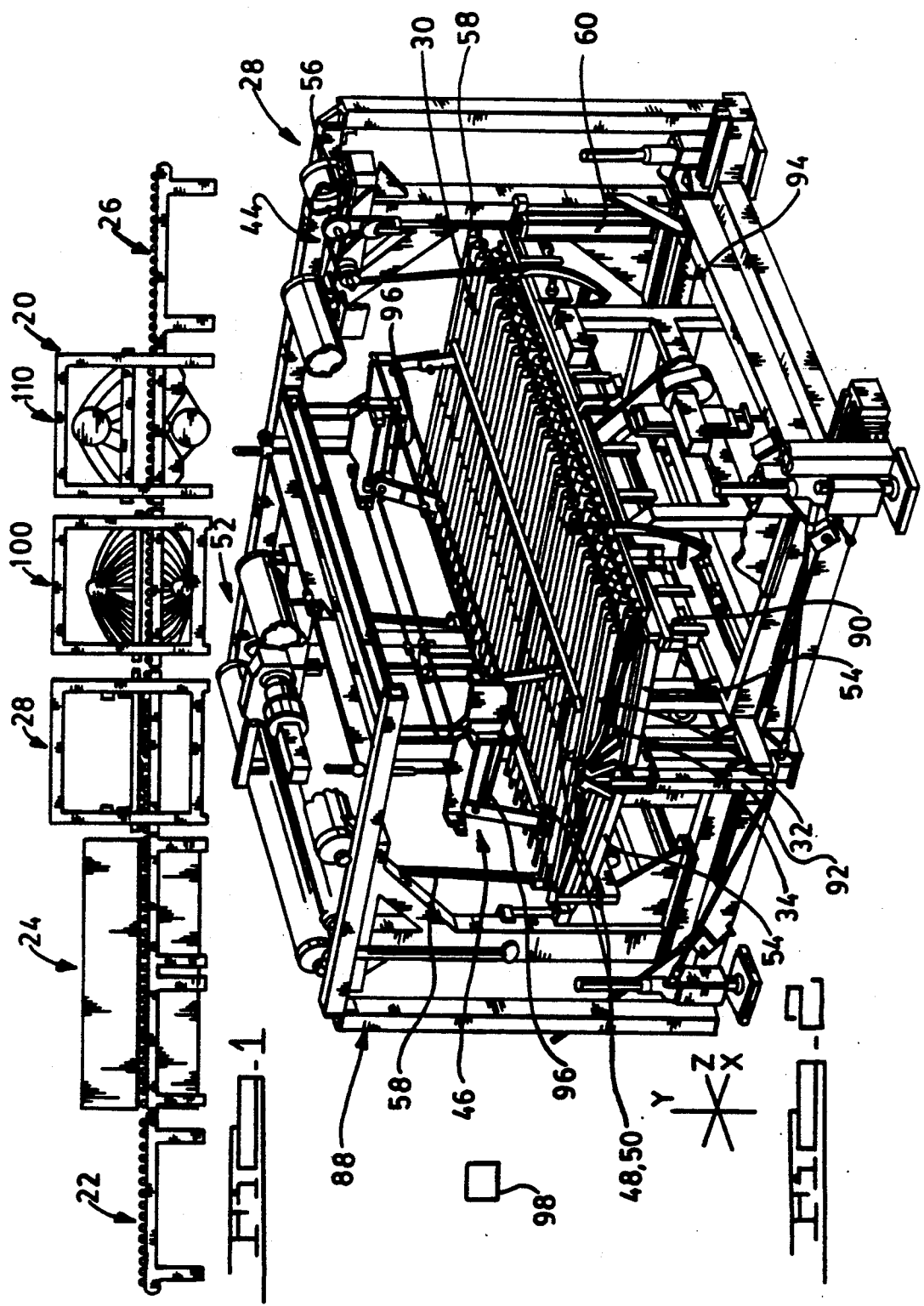

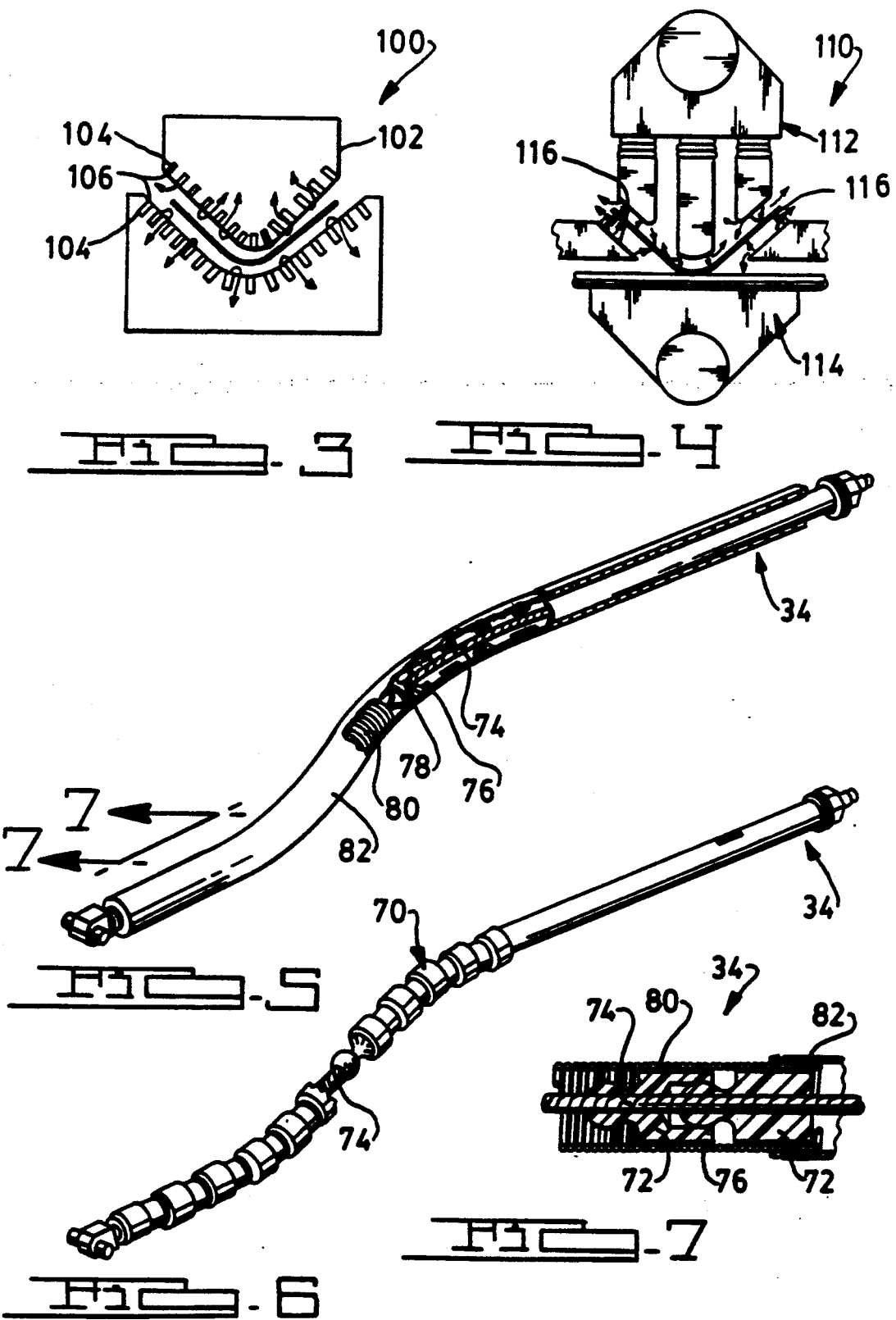

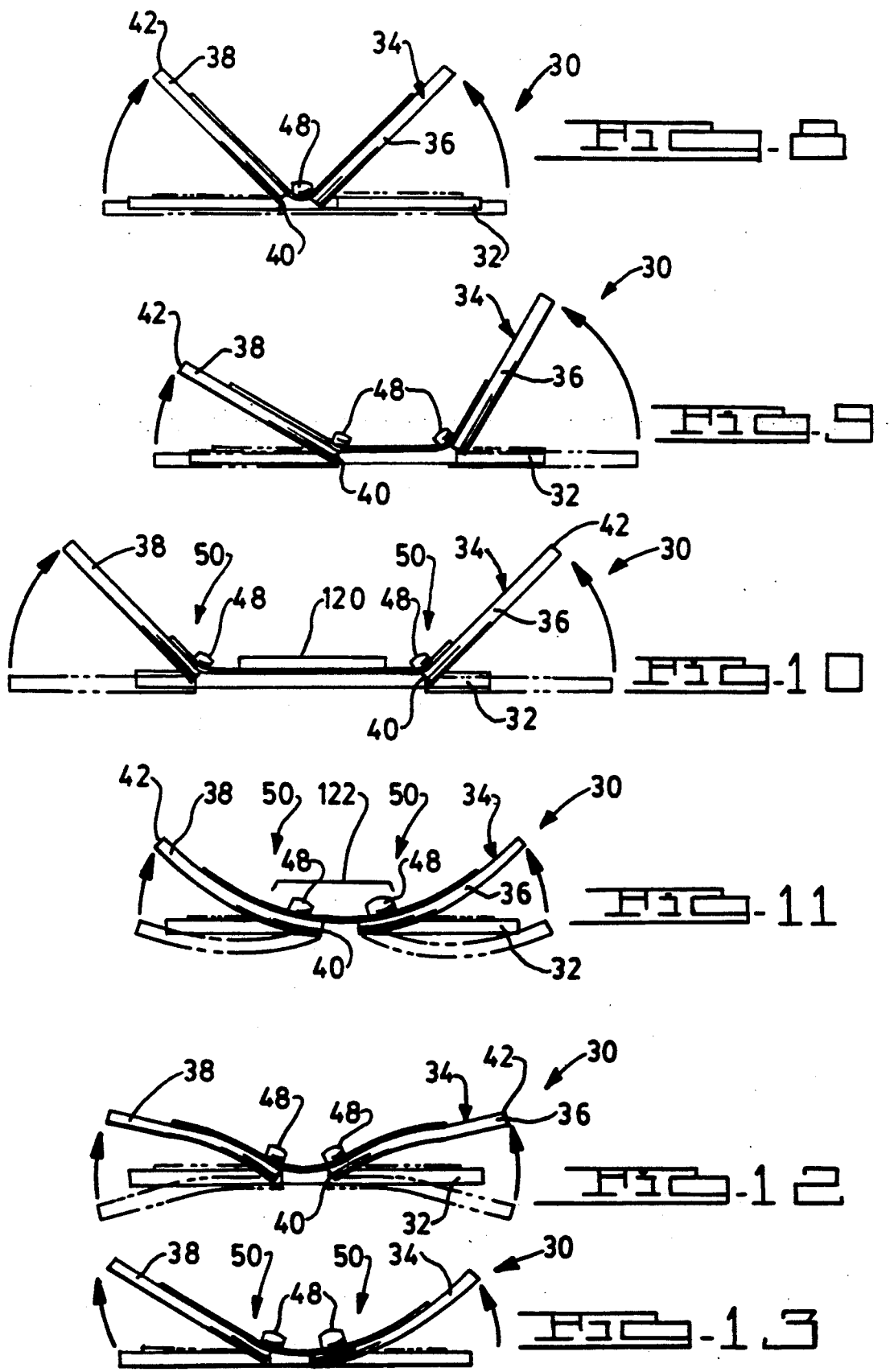

GLASS SHEET FORMING METHOD AND APPARATUS

TECHNICAL FIELD

This invention relates to an apparatus for forming and cooling a heated glass sheet.

BACKGROUND ART

French Patent No. 2,221,409 discloses a glass sheet forming apparatus for sag bending a heated glass sheet. Therein, the apparatus has interposed upper and lower horizontal parallel rollers. The upper rollers are arranged in two staggered rows, one extending from each side of the apparatus beyond a center line of the apparatus for receiving and conveying a heated glass sheet. The upper rollers are free about one end and pivotal about a fixed pivot point at the other end and work in conjunction with the lower horizontal rollers. A heated glass sheet received on the upper rollers is sag bent by pitching the upper rollers downwardly relative to the lower horizontal rollers whereby the glass sheet is sag bent to a desired shape.

Forming a glass sheet with such an apparatus marks the glass sheet as it sags along the upper rolls as the rolls are pitched downwardly. Furthermore, the fixed pivot points of the ends of the upper rollers limit the shapes that can be formed in the heated glass sheet.

In my earlier U.S. Pat. No. 4,586,946, I overcame the problems associated with sag bending with such an apparatus by disclosing a glass sheet bending apparatus including a main conveyor having straight rollers at a fixed upper elevation. I interposed stationary downwardly curved forming bars between the straight rollers at a second lower elevation. A pressing means mounted above the first elevation is actuated downwardly as the straight rollers are lowered to bend a heated glass sheet against the curved lower forming bars.

This apparatus which requires vertical movement of the main conveyor and pressing means was designed for symmetrically bending glass sheets. Such an apparatus is unable to bend heated glass sheets to a non-symmetrically curved bent shape because the roll technology as disclosed in U.S. Pat. Nos. 3,545,951; 4,226,608; and 4,311,509 would not allow a portion of the roll to have a dissimilar curvature than another portion of the same roll.

SUMMARY OF THE INVENTION

An object of the present invention is to provide an improved glass sheet forming apparatus for continuously forming a heated glass sheet.

Another object of the present invention is to provide an improved glass sheet forming apparatus that utilizes fewer movements of the apparatus to provide the forming.

Still another object of the invention is to provide an improved glass sheet forming apparatus that maintains the glass sheet generally in one plane during the forming.

A further object of the present invention is to provide an improved glass sheet forming apparatus that is adjustable for forming non-symmetrical curved bends in the glass sheet.

A still further object of the present invention is to provide an improved glass sheet forming apparatus that provides an infinitely variable-shaped conveyor roller.

In carrying out the above objects and other objects of the invention, an improved glass sheet forming apparatus for forming a heated glass sheet includes a roller conveyor defined by a plurality of first conveyor rolls and also a plurality of second conveyor rolls. The first and second conveyor rolls are interposed with one another. The first conveyor rolls are mounted in a plane defined by X and Y axes for conveying the glass sheet in a direction of conveyance perpendicular to the plane and defining a Z direction. The second conveyor rolls also are used to form the heated glass sheet.

Each second conveyor roll includes independent first and second roll portions. Each roll portion has inward and outward ends. At least one of the roll portions is movable in the plane to establish rotation of the roll portion with respect to the Z direction. The second conveyor rolls are mounted in a plane defined by X' axis and are also used for conveying the glass sheet in the Z direction.

A first actuator is operable of moving the movable roll portions so that part of the movable rolls are elevated above the X' axis and the first conveyor rolls. This rotation causes the roller conveyor to become non-planar or to adopt a curved configuration as the first roll portions of the second conveyor rolls are rotated vis a vis the first conveyor rolls in the plane defined by the X and Y axes. The heated glass sheet is formed as a result of the curved conveyor shape.

In another embodiment of the invention, the apparatus includes a forming mechanism mounted above the roller conveyor for maintaining the heated glass sheet on the roller conveyor as the movable roll portions are rotated and the glass sheet is lifted.

Preferably, the second roll portions are also movable in the plane defined by the X and Y axis to establish rotation with respect to the Z direction. A second actuator is provided for moving the second roll portions.

In one embodiment, the first and second roll portions are straight. In another, the first and second roll portions are curvilinear. In a third, the first roll portion is straight and the second roll portion is curvilinear. In yet a fourth embodiment, the first roll portion has an adjustable shape. In the fifth embodiment, both first and second roll portion have an adjustable shape.

Each adjustably shapable roller portion includes a backbone-type portion having a plurality of interconnecting members. The backbone portion includes a flexible connecting member mounting the interconnecting members which can be tensioned and relieved to apply a compressive force to the interconnecting members to hold them in a fixed shape when the connecting member is tensioned and to release the shape for adjustment when the connecting member tension is released. A sheath portion envelopes the interconnecting members and defines a bearing surface. A tubular member mounted over the sheath portion is rotatable on the sheath portion and acts as the conveyor that conveys the glass sheet and also as the means for shaping the glass sheet.

Preferably, a covering of a high heat resistant non-abrasive, flexible and non-abrading material is mounted on the tubular member. The covering contacts and engages the heated glass sheet. The sheath portion has a high heat resistance and a low coefficient of friction. Preferably, the tubular member is comprised of spring steel and the connecting member is a steel cable.

Each interconnecting member has an end having a concave shape and also an end having a generally corresponding convex shape for engagement with the concave end of an adjoining interconnecting member and also to maximize the area of the engaged surfaces. Such interconnecting members are made from high heat resistant material having a high coefficient of friction.

A frame having first and second conveyor roll supports mounts the first and second conveyor rolls respectively. The first conveyor roll support fixedly mounts the first conveyor rolls. The second conveyor roll support adjustably mounts the second conveyor rolls for movement in the X,Y plane and is also movable with respect to the first conveyor roll support. The second conveyor roll support is independently movable along the X axis and also rotationally movable in the X,Y plane. A second conveyor roll support first actuator moves the second conveyor roll support along the X' axis. Preferably, the second conveyor roll support first actuator is a rack and pinion assembly.

A second conveyor roll support second actuator rotates the second conveyor rolls in the X,Y plane. Preferably, the second conveyor roll support second actuator is a chain driven assembly.

In the preferred embodiment of the invention, a forming mechanism is mounted above the roller conveyor. Engagement members, preferably wheels or rollers, engage the glass sheet in rolling contact to maintain the heated glass sheet on the roller conveyor as the second conveyor rolls are rotated in the X,Y plane to facilitate the forming and allow difficult shapes to be formed in the glass sheet by restricting the upward movement of the glass sheet. The forming mechanism is mounted to and adjustably movable relative to the first conveyor roll support. Preferably, the forming mechanism includes two longitudinally extending, along the direction of conveyance, spaced opposed hold down members, each including a plurality of the engagement members, and being adjustably spaceable from each other and also vertically movable for accommodating various shapes of the roller conveyor. A forming mechanism actuator moves the forming mechanism. Preferably, the forming mechanism actuator is a worm gear assembly.

Preferably, a controller controls the bending rate of the glass sheet by controlling the upward movement of the second conveyor rolls. Preferably, the controller is a programmable logic controller.

In an alternative arrangement of forming section, an elongated upper roller is mounted above the first conveyor rolls between the holddown members to assist in maintaining the glass sheet on the roller conveyor during the bending. In another arrangement, a heat shield is mounted above the first conveyor rolls and extends between the holddown members. The heat shield reflects the heat transferred from the heated glass sheet downwardly to maintain the temperature of the heated glass sheet. It is apparent that the upper roller feature and heat shield feature are combinable to obtain the advantages of both.

A compressed gas cooling system located adjacent the forming section provides compressed gas to establish a temperature gradient between the glass sheet surface and core. Preferably, the compressed gas cooling system includes a template corresponding to the shape of the bent glass sheet mounted in the X,Y plane and a plurality of elongated tubes for supplying cooling gas removably mounted to the template. A subsequent blower gas cooling system includes upper and lower plenums having cooling gas delivery surfaces with orifices therein for delivering cooling gas at low pressure to both sides of the bent glass sheet, to maintain the temperature gradient established in the compressed gas cooling system.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic view of a glass sheet forming apparatus constructed in accordance with the present invention illustrating a loading section; furnace section; forming section; compressed cooling section; blower gas cooling section; and unloading section;

FIG. 2 is a perspective view of the forming section of FIG. 1 illustrating a plurality of first and second conveyor rolls;

FIG. 3 is an elevational end view of the compressed gas cooling section of FIG. 1 illustrating a template mounting cooling gas tubes;

FIG. 4 is an elevational end view of the blower gas cooling section of FIG. 1 illustrating upper and lower plenums;

FIG. 5 is a partially cut-away perspective view of an adjustably shapable shaping roller for use with the forming apparatus;

FIG. 6 is another partially cut-away perspective view of the shaping roller of FIG. 5 illustrating its backbone-type construction FIG. 7 is an enlarged sectional view of a portion of the shaping roller of FIG. 5; and FIGS. 8-13 are schematic views of a first conveyor roll and a variously configured second conveyor roll for shaping the glass sheet.

BEST MODE FOR CARRYING OUT THE INVENTION

Referring to FIG. 1 of the drawings, a glass sheet forming apparatus constructed in accordance with the present invention is generally indicated by reference numeral 20 and is used for forming and subsequently cooling a heated glass sheet. The forming apparatus 20 is illustrated in its environment which includes a load table 22 and glass sheet heating furnace 24 which precede the forming apparatus, followed by an unload table 26. As is hereinafter more fully described, the forming apparatus 20 provides a means for forming a heated glass sheet into a variety of curved shapes, including non-symmetrical curved shapes, and subsequently cools the formed glass sheet as required.

With further reference to FIG. 1 of the drawings, the glass sheet forming apparatus 20 includes a forming section 28 illustrated in greater detail in FIG. 2. The forming section includes a roller conveyor 30 defined by a plurality of first conveyor rolls 32 and also a plurality of second conveyor rolls 34. The first and second conveyor rolls 32,34 are interposed with one another. The first conveyor rolls 32 are mounted in a plane defined by X and Y axes for conveying a glass sheet in a direction of conveyance perpendicular to the plane and defining a Z direction. Each second conveyor roll 34 includes independent first and second roll portions 36,38, respectively, see FIGS. 8-12. Each roll portion 36,38 has an inward end 40 and an outward end 42, inward and outward being with respect to the forming apparatus 20.

At least one of the roll portions 36,38 is movable in the X,Y plane to establish rotation of that roll portion with respect to the Z direction. The second conveyor rolls 34 are mounted in a plane defined by X' axis and also convey the glass sheet in the Z direction.

A first actuator 44 moves the movable roll portions 36,38 so that part of the movable rolls are elevated above the X' axis and above the first conveyor rolls 32 whereby the roller conveyor 30 becomes nonplanar as the first roll portions 36 are rotated vis a vis the first conveyor rolls 32 in the X,Y plane. Thus, the heated glass sheet is formed as a result of its heated condition and the non-planar conveyor shape and upward action of the second conveyor rolls 34.

With further reference to FIG. 2 of the drawings, the forming section 28 includes a forming mechanism 46 mounted above the roller conveyor 30. The forming mechanism 46 includes an engagement member 48 for engaging the glass sheet in rolling contact to maintain the heated glass sheet on the roller conveyor as the second conveyor rolls 34 are rotated in the X,Y plane to provide the non-planar shape that allows for the bending of the heated glass sheet. The forming mechanism 46 thereby allows difficult shapes to be formed in the glass sheet by restricting the upward movement of the glass sheet. Preferably, the engagement member is a plurality of idler wheels or discs. Preferably, the engagement member 48 includes two holddown members 50 being elongated mounts for mounting the plurality of the idler wheels or discs. The holddown members 50 extend in the direction of conveyance or Z direction and are adjustably spaceable and vertically movable.

Preferably, the second roll portions 38 are also movable in the X,Y plane to establish rotation with respect to the Z direction. A second actuator 52 rotates the movable roll portions 38 in the same manner as does the first actuator 44. First and second actuators 44,52 are roller chain driven assemblies.

The movable roll portions 36,38 are mounted on a pivoting frame 54. As illustrated in FIG. 1, there are two pivoting frames 54, one supporting a plurality of the first roll portions 36 and the other mounting the second roll portions 38. A computer controlled motor and gear reducer 56 is operable to actuate movement of chain 58 which causes the pivoting frame 54 to rotate. An air cylinder 60 is included with the actuators 44,52 to create a load on the chain 58 that counterbalances some of the weight of the pivoting frame 54 and roll portions 36,38 mounted frame 54. Each of the pivoting frames 54 is independently actuated so that the roll portions 36,38 can be actuated independently and thusly used for non-symmetrical bending of a glass sheet.

With reference to FIGS. 8-13 of the drawings, various combinations of roll shapes can be used to provide differently bent glass sheet shapes. FIGS. 8-10 illustrate the use of straight first and second roll portions 36,38 that are pivoted at different transverse locations with respect to the first conveyor rolls 32 to form a differently shaped forming surface for the glass sheet. FIGS. 11 and 12 illustrate the use of curved first and second roll portions 36,38. FIG. 13 illustrates the use of a straight and a curved roll portion 36,38 in combination. In FIG. 11, the roll portions 36,38 have a symmetrically curved shape and in FIG. 12 the roll portions 36,38 have a curved shape that varies along the length of the curved roll portions. The curved roll portions 36,38 are seen in greater detail in FIGS. 5, 6 and 7. The ability to combine differently configured roll portions 36,38 combined with the transversely adjustable spacing of the center of rotation of the roll portions in the X' and Y planes provides a variety of shaping surface configurations for forming glass sheets.

With reference to FIGS. 5, 6 and 7, a roll portion 36,38 having an adjustable shape is illustrated. Such a roll portion 36,38 includes a backbone-type portion 70 including a plurality of interconnecting members 72. The backbone portion 70 also includes a flexible connecting member 74 that mounts the interconnecting member 72. A sheath portion 76 envelops the interconnecting members 72 and defines a bearing surface 78. A tubular member 80 is mounted over the sheath portion 76 and is rotatable on the sheath portion. The connecting member 74 is a steel cable that is maintainable in tension to urge the interconnecting members 72 together to fix a shape in the roll portion 36,38. This tension is releasable to allow the roll portions 36,38 to be shaped, usually over a template, to a desired shape at which time the tension is reestablished to maintain the interconnecting members in fixed position.

Preferably, a covering 82 having a high heat resistance, being non-abrasive, flexible and non-abrading is mounted on the tubular member 80. KEVLAR ® material is a suitable material for the covering.

The sheath portion 76 has a high heat resistance and a low coefficient of friction. TEFLON ® material is preferred for the sheath portion 76. Tubular member 80 is comprised of spring steel.

As illustrated in FIG. 7, the interconnecting member 72 has an end 84 having a concave shape and an end 86 having a generally corresponding convex shape for engagement with the concave end of an adjoining interconnecting member. The shapes of ends 84 and 86 maximize the area of the engaged surfaces. Preferably, the interconnecting members 72 are made from high heat resistant materials having a high coefficient of friction such as steels.

Referring again to FIG. 2 of the drawings, a frame 88 has first and second conveyor roll supports 90,92. The first conveyor roll support 90 fixedly mounts the first conveyor rolls 32. The second conveyor roll support 92 adjustably mounts the second conveyor rolls via pivoting frame 54. The second conveyor roll support 92 is movable in the X, Y plane with respect to the first conveyor roll support 90. The second conveyor roll support 92 is independently movable along the X' axis and also rotationally movable in the X, Y plane as hereinabove explained. A second conveyor roll support first actuator 94 moves the second conveyor roll support 92 along the X' axis. The second conveyor roll support first actuator 94 is a rack and pinion assembly. The first and second actuators 44,52 which rotate the roll portions 36,38 of the second conveyor rolls 34 in the X', Y plane together with the rack and pinion assembly 94 and the adjustable shape of the roll portions 36,38 provide an infinite variety of shaping surfaces which can be established for forming glass sheets. Actuator 94 can be operated during the bending of the glass sheet to move pivoting frames 54 outwardly to eliminate relative motion between the first and second roll portions 36,38 and the glass sheet or to put tension in the glass sheet.

As seen in FIGS. 2 and 8-12, the forming mechanism 46 is mounted to and adjustably movable relative to the first conveyor roll support 90 and includes a forming mechanism actuator 96. Preferably, the forming mechanism actuator 96 is a worm gear assembly as seen in FIG. 2. A controller 98 in communication with gear reducer 56 controls the bending rate as hereinabove described. Preferably, the controller 98 is an industrial P.C. such as that sold by COMARK Corp. and identified as a 386 industrial work station.

FIG. 3 illustrates a first glass sheet cooling section 100 for establishing a temperature gradient between the glass sheet surface and core immediately after the bending. The first glass sheet cooling means 100 is a compressed gas cooling system providing a high heat transfer coefficient. They system 100 includes a template 102 mounted in the X, Y plane that corresponds to the shape of the bent glass sheet.

A plurality of elongated tubes 104 are removably mounted to the template 102 and supply compressed cooling gas. The tubes 104 are of a small cross section and spaced to facilitate the exhausting of the cooling gas. The tubes 104 are removably mounted to the template 102 to take the shape of the template and to facilitate cooling in close proximity and with equal distance to the formed shaped surface of the glass sheet. Tubes 104 include nozzles 106 mounted on and extending from the surface of the tubes.

FIG. 4 illustrates a second glass sheet cooling section 110 that provides secondary cooling of the bent glass sheet. Second glass sheet cooling means 110 maintains the temperature gradient established between the glass sheet surface and core in the first glass sheet cooling section 100 and further cools the glass sheet. The second glass sheet cooling section 110 includes upper and lower plenums 112,114 having cooling gas delivery surfaces 116 having orifices therein for delivering cooling gas at low pressure, in the range of between 5 and 20 inches of water, to both sides of the bent glass sheet.

With further reference to FIGS. 10 and 11, in an alternative arrangement of forming section 28, an elongated upper roller 120 is mounted above the first conveyor rolls 32 between the holddown members 50 to assist in maintaining the glass sheet on the roller conveyor 30 during the bending, see FIG. 10. In FIG. 11, a heat shield 122 is mounted above the first conveyor rolls 32 and extends between the holddown members 50. Heat shield 122 reflects the heat transferred from the heated glass sheet downwardly to maintain the temperature of the heated glass sheet. It is apparent that the upper roller 120 and heat shield 122 are combinable in one embodiment to obtain the advantages of both.

While the best mode for carrying out the invention has been described in detail, those familiar with the art to which this invention relates will recognize various alternative designs and embodiments for practicing the invention as defined by the following claims.

What is claimed is:

1. A glass sheet forming apparatus for forming a heated glass sheet, the forming apparatus comprising:
   a forming station including;
   a roller conveyor defined by a plurality of first conveyor rolls and also a plurality of second conveyor rolls; said first and second conveyor rolls being interposed with one another; each of said first conveyor rolls being mounted in a respective vertical plane for conveying the glass sheet in a direction of conveyance in a horizontal plane; each of said second conveyor rolls also being mounted in a respective vertical plane for conveying the glass sheet in a horizontal direction of conveyance; each of said second conveyor rolls including independent first and second roll portions; each of said roll portions having inward and outward ends; at least one of said first and second roll portions being vertically movable to establish movement of said at least one roll portions with respect to the horizontal plane; and
   a first actuator for moving said one of said first and second roll portions so that part of said on roll portions are elevated above said first conveyor rolls whereby the roller conveyor becomes nonplanar, as said one roll portions of said second conveyor rolls are moved vis a vis said first conveyor rolls, sand the heated glass sheet is formed as a result of the non-planar conveyor shape and upward action of said second conveyor rolls.

2. A glass sheet forming apparatus as in claim 1 wherein said other of said first and second roll portions are also vertically movable to establish movement with respect to the horizontal plane, and a second actuator for moving the other of said first and second roll portions so that part of said other roll portions are elevated above said first conveyor roll.

3. A glass sheet forming apparatus as in claim 1 wherein said first and second roll portions are straight.

4. A glass sheet forming apparatus as in claim 1 wherein said first and second roll portions are curvilinear.

5. A glass sheet forming apparatus as in claim 1 wherein said first roll portions are straight and said second roll portions are curvilinear.

6. A glass sheet forming apparatus as in claim 1 wherein said first roll portions have an adjustable shape and comprise:
   a backbone type portion including a plurality of interconnecting members; said backbone portion also including a flexible connecting member mounting said interconnecting members;
   a sheath portion enveloping said interconnecting members; said sheath portion defining a bearing surface; and
   a tubular member mounted over said sheath portion and rotatable thereon.

7. A glass sheet forming apparatus as in claim 6 wherein said connecting member is maintainable in tension to urge said interconnecting members together to fix a shape in said roll portions.

8. A glass sheet forming apparatus as in claim 7 further including a covering mounted on said tubular member; said covering having high heat resistance, being non-abrasive, flexible and non-abrading.

9. A glass sheet forming apparatus as in claim 7 wherein said sheath portion has high heat resistance and a low coefficient of friction.

10. A glass sheet forming apparatus as in claim 7 wherein said tubular member is comprised of spring steel.

11. A glass sheet forming apparatus as in claim 7 wherein said connecting member is a steel cable.

12. A glass sheet forming apparatus as in claim 7 wherein each interconnecting member has an end having a concave shape and also an end having a generally corresponding convex shape for engagement with the concave end of an adjoining interconnecting member and also to maximize the area of the engaged surfaces.

13. A glass sheet forming apparatus as in claim 12 wherein said interconnecting members are made from heat resistant materials having a high coefficient of friction.

14. A glass sheet forming apparatus as in claim 1 further including a frame having first and second conveyor roll supports; said first conveyor roll support fixedly mounting said first conveyor rolls; and said second conveyor roll support adjustably mounting said first and second roll portions.

15. A glass sheet forming apparatus as in claim 14 wherein said second conveyor roll support is independently movable inwardly and outwardly with respect to the direction of conveyance and also rotationally relative to the horizontal direction, and a second conveyor roll support first actuator for moving said second conveyor roll support inwardly and outwardly.

16. A glass sheet forming apparatus as in claim 15 wherein said second conveyor roll support first actuator comprises a rack and pinion assembly.

17. A glass sheet forming apparatus as in claim 16 further including a second conveyor roll support second actuator for rotating said second conveyor rolls in said horizontal direction.

18. A glass sheet forming apparatus as in claim 17 wherein said second conveyor roll support second actuator comprises a chain driven assembly.

19. A glass sheet forming apparatus as in claim 18 further including a controller for controlling the chain driven assembly to control the bending rate.

20. A glass sheet forming apparatus as in claim 19 wherein said controller is an industrial P.C.

21. A glass sheet forming apparatus as in claim 14 further including a first glass sheet cooling means mounted adjacent said forming station for establishing a temperature gradient between the glass sheet surface and core.

22. A glass sheet forming apparatus as in claim 21 wherein said first cooling section is a compressed gas cooling system providing a high heat transfer coefficient, said first cooling section also including a roller conveyor for conveying the bent glass sheet therethrough.

23. A glass sheet forming apparatus as in claim 22 wherein said compressed gas cooling section includes a template, corresponding to the shape of the bent glass sheet, mounted in a vertical plane; a plurality of elongated tubes for supplying cooling gas; said tubes being of small cross-section and spaced to facilitate the exhausting of cooling gas; said tubes being removably mounted to said template to thereby take the shape of said template and to facilitate cooling in close proximity and equal distance to the formed shape surface of the glass sheet.

24. A glass sheet forming apparatus as in claim 23 wherein said tubes include nozzles mountable on and extending from the surface of said tubes.

25. A glass sheet forming apparatus as in claim 21 further including a second glass sheet cooling means mounted adjacent said first glass sheet cooling means for providing secondary cooling of the bent glass sheet to maintain said temperature gradient between the glass sheet surface and core.

26. A glass sheet forming apparatus as in claim 25 wherein said second glass sheet cooling section includes upper and lower plenums having cooling gas delivery surfaces having orifices therein for delivering cooling gas at low pressure to both sides of the bent glass sheet thereby to maintain the temperature gradient between the glass sheet surface and core and provide further cooling, said second section also including a roller conveyor for conveying the bent glass sheet therethrough.

27. A glass sheet forming apparatus as in claim 1 further including a forming mechanism mounted above said roller conveyor; said forming mechanism including at least one engagement member for engaging the glass sheet in rolling contact to maintain the heated glass sheet on said roller conveyor as said at least one of said first and second roll portions are vertically moved to allow forming difficult shapes in the glass sheet by restricting the upward movement of the glass sheet.

28. A glass sheet forming apparatus as in claim 27 wherein said engagement member is an idler wheel.

29. A glass sheet forming apparatus as in claim 28 wherein said forming mechanism includes two holddown members; said holddown members being elongated mounts for mounting a plurality of said wheels; said holddown members extending in the direction of conveyance.

30. A glass sheet forming apparatus as in claim 29 further including an upper roller mounted above said first conveyor rolls and located between said holddown members to assist in maintaining the glass sheet on said roller conveyor.

31. A glass sheet forming apparatus as in claim 29 further including a heat shield mounted between said holddown members to reflect the heat transferred from the heated glass sheet downwardly.

32. A glass sheet forming apparatus as in claim 29 further including an upper roller mounted above said first conveyor rolls and located between said holddown members to assist in maintaining the glass sheet on said roller conveyor and also including a heat shield mounted above said upper roller to reflect the heat transferred from the heated glass sheet downwardly.

33. A glass sheet forming apparatus as in claim 27 wherein said forming mechanism is mounted to said first conveyor roll support.

34. A glass sheet forming apparatus as in claim 33 further including a forming mechanism actuator for adjustably moving the forming mechanism relative to the first conveyor roll support.

35. A glass sheet forming apparatus as in claim 34 wherein said forming mechanism actuator comprises a worm gear assembly.

36. A method of forming a heated glass sheet comprising the steps of:
   disposing the glass sheet on a roller conveyor defined by a plurality of interposed first and second conveyor rolls; said second conveyor rolls being defined by independent movable first and second roll portions; and
   moving one of said roll portions vis a vis said first conveyor rolls so that part of said moved roll portions are elevated above said first conveyor roll whereby the roller conveyor becomes non-planar forming the heated glass sheet by the non-planar conveyor shape and upward action of said movable roll portions.

37. A method as in claim 36 further including the step of moving the other of said one roll portion vis a vis said first conveyor rolls so that part of said first and second roll portions are elevated above said first conveyor rolls.

38. A method as in claim 36 further including the step of moving one of said first and second roll portions relatively outwardly with respect to said first conveyor rolls during the forming to develop tension in the glass sheet.

39. A method as in claim 36 further including the step of moving said first and second roll portions away from each other during the forming to develop tension in the glass sheet.

* * * * *

UNITED STATES PATENT AND TRADEMARK OFFICE
CERTIFICATE OF CORRECTION

PATENT NO.  : 5,201,928

DATED       : April 13, 1993

INVENTOR(S) : KARL-HEINZ DICKS and EUSTACE H. MUMFORD

It is certified that error appears in the above-identified patent and that said Letters Patent is hereby corrected as shown below:

Column 8, claim 1, line 6, after "said" delete "on" and insert -- one --.

Column 8, claim 1, line 11, after "rolls," delete "sand" and insert -- and --.

Column 10, claim 36, line 49, after "conveyor" delete "roll" and insert -- rolls --.

Signed and Sealed this

Thirtieth Day of November, 1993

Attest:

BRUCE LEHMAN

Attesting Officer

Commissioner of Patents and Trademarks